Sept. 8, 1942.   J. J. GABALIS ET AL   2,294,975
AUXILIARY PUMP REGULATOR
Filed March 5, 1941   2 Sheets-Sheet 1

INVENTORS
JULIUS J. GABALIS AND
ANTHONY F. SCHWENDNER,
BY
ATTORNEY

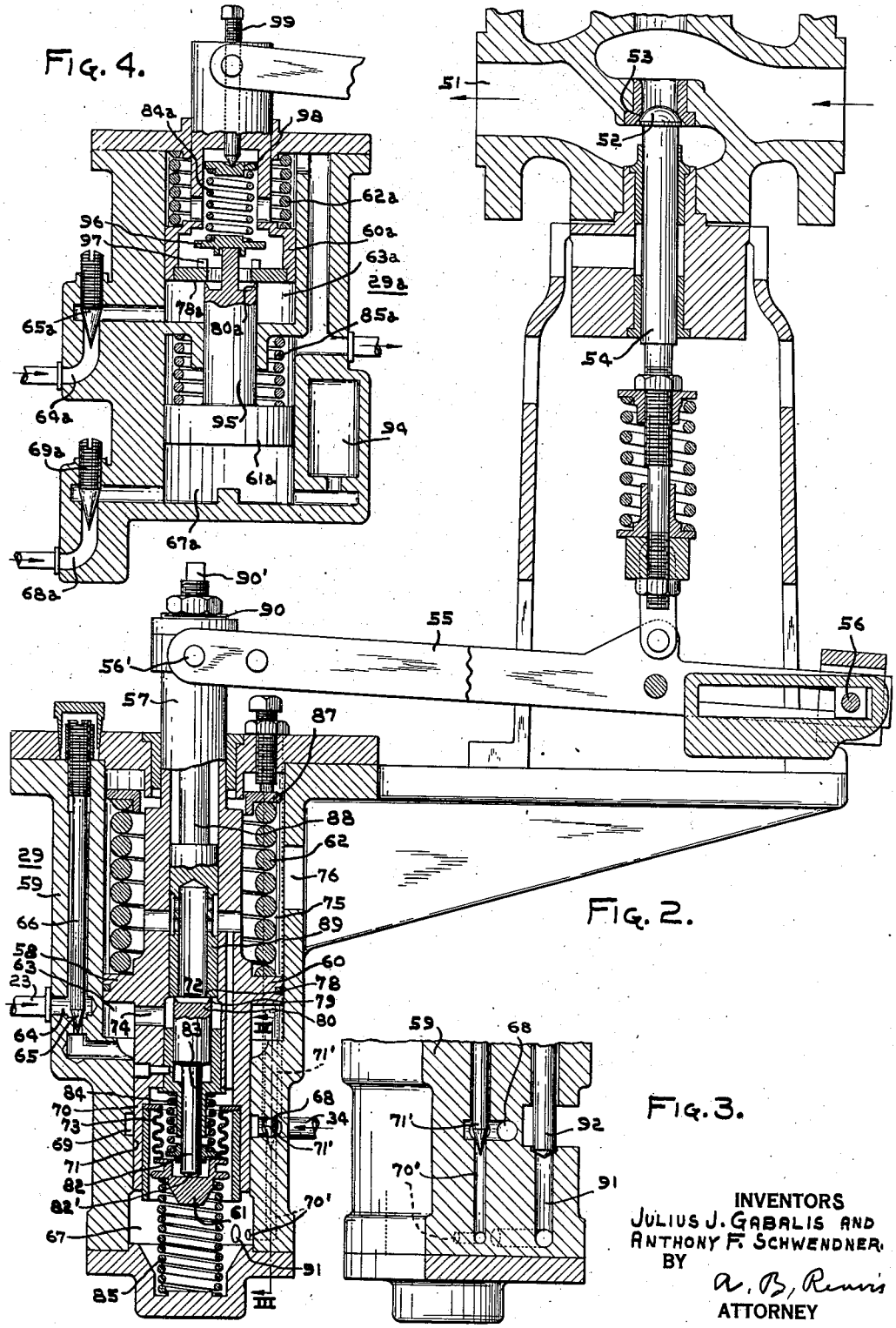

Patented Sept. 8, 1942

2,294,975

UNITED STATES PATENT OFFICE 2,294,975

AUXILIARY PUMP REGULATOR

Julius J. Gabalis, Philadelphia, and Anthony F. Schwendner, Ridley Park, Pa., assignors to Westinghouse Electric & Manufacturing Company, East Pittsburgh, Pa., a corporation of Pennsylvania Application March 5, 1941, Serial No. 381,804

12 Claims. (Cl. 103—16)

The invention relates to a system including main and auxiliary pumps for supplying oil under high and low pressures, for example, under high pressure, for the operation of operating cylinders and the like and under low pressure for lubricating purposes, and it has for an object to provide a regulator operative to maintain continuity of effectiveness of the system.

A more particular object of the invention is to provide a system including main and auxiliary pumps for supplying oil under high and low pressures together with a regulator responsive either to decline of high-pressure oil below a predetermined value or to decline of low-pressure oil to initiate operation of the auxiliary pump to maintain continuity of effectiveness of the system.

A further object of the invention is to provide a system including main and auxiliary pumps for supplying oil under high and low pressures together with a regulator operative in such manner that, should the bearing or low-pressure oil decline in pressure, the energy for driving the auxiliary pump is increased and vice versa.

A further object of the invention is to provide a regulator for a system of the character described and which is operative so that, should the bearing or low-pressure oil decline in pressure, the energy for driving the auxiliary pump is increased and vice versa, and, wherein the supply of energy for driving the auxiliary pump cannot be cut off until a predetermined value of pressure of high-pressure oil is reached.

A further object of the invention is to provide a system including main and auxiliary pumps for supplying oil under high and low pressures together with a regulator including a piston operated by the opposed forces of a spring and of pressure of oil in a chamber, supplied through an orifice from a portion of the high-pressure system, to control the supply of energy for driving the auxiliary pump and a second piston subject to the opposed forces of a spring arranged between the pistons and of low-pressure oil acting thereon to effect relative movement of the pistons to vary the escape of oil from said chamber in order to vary the pressure therein so as to effect movement of the first piston for adjustment of the energy supply for driving the auxiliary pump.

A further object of the invention is to provide a system including main and auxiliary pumps for supplying oil under high and low pressures and a regulator for controlling the energy for driving the auxiliary pump so that the latter is operated in response to decline of pressure of oil in a low-pressure portion of the system and until the pressure of oil in the high-pressure portion of the system reaches a predetermined value together with means providing for adjustment or variation of the low pressure.

A further and more particular object of the invention is to provide a system including main and auxiliary pumps for supplying oil under high and low pressures together with a regulator including a piston construction having a first area facing a first pressure chamber for oil under high pressure and a like-directed second area facing a second chamber for oil under low or bearing pressure, the arrangement being such that the piston construction moves in response to pressure change in the first chamber to control the supply of energy for driving the auxiliary pump and the second area is defined in part by an abutment or piston movable relatively to the first piston to control the escape of oil from the first chamber in order to secure movement of the first piston for the purpose stated.

These and other objects are effected by the invention as will be apparent from the following description and claims taken in connection with the accompanying drawings, forming a part of this application, in which:

Fig. 2 is a sectional view of the regulator;

Fig. 3 is a detail sectional view taken along the line III—III of Fig. 2; and,

Fig. 4 is a sectional view showing a modified form of regulator.

Figure 1:
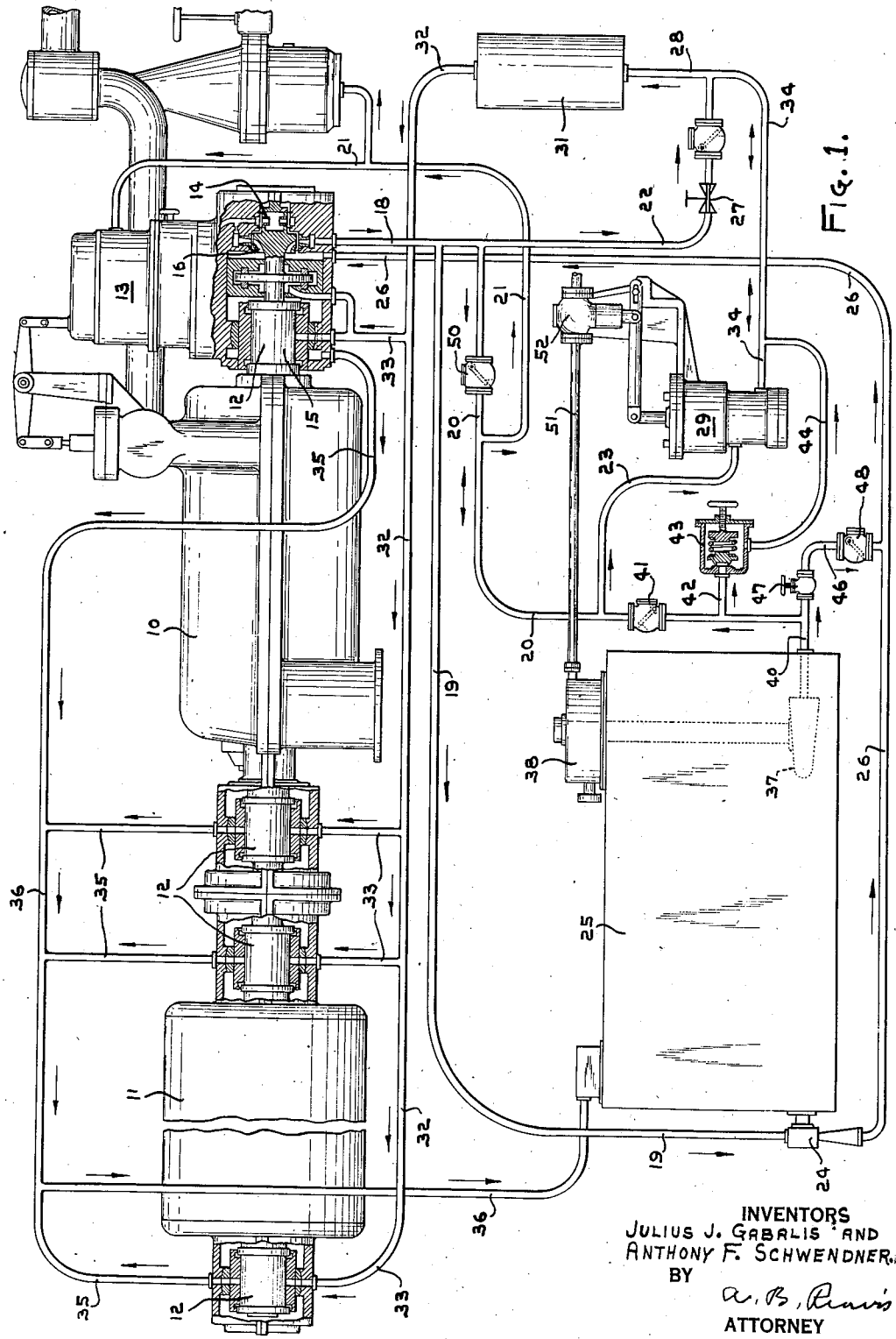
Fig. 1 is a diagram showing a system having the improved regulator applied thereto.

In the drawings, there is shown a turbine 10 driving a generator 11, bearings being provided for the turbine and generator rotors.

The turbine 10 has the admission of steam thereto controlled by a hydraulic governor, at 13, operated in response to turbine speed by means of oil under pressure furnished by the impeller 14, the latter being driven by the turbine shaft or spindle 15.

A centrifugal impeller 16, also driven by the turbine shaft or impeller 15, provides the main pump for normally supplying the system to be described with oil, the system including a high-pressure portion for furnishing oil to servo-motors and the like and a low-pressure portion for supplying the bearings.

The high-pressure portion of the system supplied by the impeller 16 includes the connected conduits 18, 19, 20, 21, 22, and 23. The conduit 19 supplies motive oil to the ejector 24 for translating or pumping oil from the tank 25, through the conduit 26, to the inlet or eye of the impeller 16. The conduit 21 supplies oil for the operation of the servo-motors and the like. The conduit 22 supplies oil through the orifice 27 to the conduit 28 of the low-pressure system. The conduit 23 supplies high-pressure oil to the regulator, at 29.

The low-pressure system includes the conduit 28, the oil cooler 31, the conduit 32 with branches 33 leading to the bearings 12, and a conduit 34 connected to the regulator, at 29.

Oil draining from the bearings is returned by the branch conduits 35 and the main conduit 36 to the tank 25.

An auxiliary pump 37 driven, for example, by means of a turbine 38, has a discharge conduit 40 connected, through a check valve 41, to the conduits 20 and 23 of the high-pressure system. The conduit 40 is also connected, by means of a conduit 42, through a relief valve 43 and the conduit 44 to the conduit 34 of the low-pressure system. Furthermore, the discharge conduit of the auxiliary pump is connected by a conduit 46 including the orifice needle valve 47 and the check valve 48 to the ejector discharge conduit 26, the conduit 46 providing for priming of the impeller 16.

When starting, it is necessary to furnish the system with oil by some means other than the impeller 16 until the latter may develop sufficient pressure. Furthermore, with the system shown, particularly because the impeller is vented to secure purging of air and gases, a minimum pressure exists for the impeller suction and below which the system becomes unstable, this minimum pressure being at a point where the pressure relation at the vent tends to change, that is, instead of discharging out the vent, air is sucked therethrough and into the system, thereby producing immediate breakdown. It is the function of the regulator, at 29, to control the auxiliary pump so as to maintain continuity of the system, the auxiliary pump being placed in service when starting up and when the bearing pressure tends to decline, the auxiliary pump being in operation until the oil pressure of the high-pressure portion of the system reaches a predetermined value.

With the system supplied by the impeller 16, the check valve 41 prevents oil from being supplied from the conduit 20 to the discharge conduit system of the auxiliary pump and the check valve 48 prevents back flow from the ejector discharge conduit 26. When the system depends upon the auxiliary pump, the check valve 41 opens to place the conduit 40 in communication with conduits 20, 21, and 23 of the high-pressure portion of the system, the check valve 50 then closing to prevent back flow from conduit 20 into the impeller.

The regulator, at 29, controlling the supply of energy to the auxiliary pump 37 is shown as being arranged to control the flow of steam through the conduit 51 to turbine 38, a valve at 52, being employed for this purpose. Preferably the valve, at 52, is of the plug type, it comprising a cooperating seat 53 and movable plug 54 pivotally connected to the lever 55. One end of the lever is connected to the adjustable fulcrum 56 and the other end has a pivotal connection 56' with respect to the upper end of the movable stem 57 of the regulator.

The regulator includes a piston construction, at 58, and a housing 59.

As shown in Fig. 2, the piston construction, at 58, includes an upper piston 60 and a lower piston 61. A spring 62 exerts force on the piston construction in such a direction as to tend to open the valve 52.

The housing 59 provides the pressure chamber 63 to which oil from the high-pressure portion of the system is supplied by means of the passage 64 including the restriction or orifice 65, preferably formed by the adjustable needle valve 66, the force of pressure in the chamber 63 acting on the piston 60 in opposition to the spring 62 to move the valve 52 in a closing direction.

The piston 61 has its pressure area exposed to the chamber 67 supplied with oil from the low-pressure portion of the system by means of the pressure passage 68, flow from the passage 68 to the chamber being effected in any suitable restricted manner. In Fig. 2, the restriction is provided by means of the annular groove 69 encompassing the cylindrical portion 70 of the piston construction, the leakage between the portion 70 and the bore 71 being sufficient to provide the necessary restriction.

The piston 61 is movable relative to the piston 60 in order to vary the escape of oil from the chamber 63 by means of the valve, at 72. If the valve, at 72, is restricted, then the pressure builds up in the chamber 63 and the piston construction, at 58, moves upwardly, in order to move the valve, at 52, in a closing direction. On the other hand, if the escape flow area of the valve is increased, then the pressure in the chamber is lowered, with the result that the valve 52 is moved in an opening direction to increase the supply of energy to the auxiliary pump.

In Fig. 2, relative movement of the pistons 60 and 61 is provided for by having the spring 84 interposed therebetween and then by having the piston or abutment 61 connected thereto by means of the bellows 73.

To provide for escape of oil from the chamber 63, the piston construction, at 58, has a passage 74 opening from said chamber into the space 75 above the piston 60, the latter space having an overflow or drain outlet 76.

The valve, at 72, is arranged to control escape through the passage 74. As shown, the structure defining the passage 74 provides an annular seat 78 with which cooperates the edge 79 of the movable cup valve 80. With the edge 79 in contact with the seat 78, flow from the chamber 63 through the escape passage 74 would be interrupted; and, to the extent that the edge 79 of the cup valve is separated from the seat 78 to that extent is the resistance to escape diminished.

The cup valve 80 has a depending stem 82 arranged in the valve sleeve 83 connected to the piston construction and the lower end of the stem has a seat member 82' for the load spring 84 arranged between it and the upper piston 60. As the stem abuts the piston or abutment 61, it will be apparent that the spring 84 exerts its force on the piston or abutment 61 in opposition to that of low-pressure oil in the chamber 67.

A scale spring 85 cooperates with the piston or abutment 61 so that the resultant of the forces thereof and of low-pressure oil acting on the piston 61 is opposed by the force of the load spring 84.

From the structure so far described, it will be apparent that, should the bearing pressure tend to decline, the piston 61 will move downwardly due to the force of the spring 84, thereby opening the valve, at 72, and decreasing the pressure in the chamber 63 with the result that the piston construction, at 58, moves downwardly under the influence of the spring 62 to move the valve, at 52, in an opening direction to initiate or increase the supply of steam to the auxiliary pump turbine. On the other hand, should the low or bearing pressure tend to increase, the contrary operation will take place, the valve being restricted and the steam valve, at 52, being moved in a closing direction.

The scale spring 85 exerts a varying force on the piston construction depending upon the position of the latter. When the piston construction is in its lowermost position, the scale spring exerts its maximum upward force on the piston or abutment 61; and when the piston construction is in its uppermost position, the scale spring exerts its minimum force on the piston construction. As the piston construction moves upwardly, the scale loading thereof is reduced; and, to maintain the equilibrium condition on the piston 61, the loading of the load spring 84 is decreased to the same extent. This means that the spring 84 expands slightly and moves the cup valve slightly in an opening direction. As the piston construction moves downwardly, the contrary operation takes place, the increase in loading of the scale spring 85 being accompanied by slight upward movement of the piston 61 to increase the loading of the spring 84 to maintain the equilibrium condition, this bringing about a restriction of the valve 72. Thus, the piston construction has a range of movement determined by the scale of the scale spring, the low or bearing pressure being somewhat higher with the piston construction at the top of its stroke and the valve, at 52, closed than it is with the piston construction at the bottom of the stroke and with the valve open.

If the bearing pressure should tend to decline, then the escape valve, at 72, is opened and the piston 60 moves downwardly to move the steam valve, at 52, in an opening direction either to initiate operation of the auxiliary pump or to increase the capacity of the latter. Thus, it is assured that any decrease in bearing pressure is followed immediately by placing the auxiliary pump in operation irrespective of what the pressure in the high-pressure portion of the system may be. On the other hand, the arrangement prevents closing of the steam valve until the high pressure reaches a predetermined value. For a given rate of escape from the chamber 63, determined by the valve, at 72, a minimum pressure is necessary in the chamber to keep the piston 60 elevated against the force of the spring 62, and until this pressure exists, the piston cannot move the valve 52 in the closing direction. Thus, it will be seen that a minimum pressure is required in the chamber 63 before the valve 52 can be closed and the supply of steam to the auxiliary pump turbine cut off.

The force of the spring 62 may be varied by adjustment of the abutment 87. As the spring force is increased, the minimum value of the high pressure at which the steam valve is closed is raised and vice versa.

The bearing pressure may be adjusted by axially varying the position of the structure having the seat 78 with respect to the piston 60. To this end, the piston has an upper hollow stem containing a core member 88 having lower tubular portion 89 provided with the seat 78. If the core member is adjusted upwardly to raise the seat 78 relative to the piston 60, it will be apparent that, to maintain the same escape flow area, the spring 84 will have to be compressed; and, to secure this compression, an increase in the low pressure is necessary. On the other hand, if the core member is adjusted downwardly relatively to the piston, the bearing pressure is decreased to the extent thereof. The core member 88 may be adjusted relative to the piston 60 by any suitable means, for example, it may have a threaded upper end 90 meshing with corresponding threads formed on the interior of the stem 57, a squared end 90' being provided for turning the core member.

To test the operativeness of the apparatus, the low-pressure chamber 67 communicates with a passage 91 whose discharge end is connected to the exterior, the discharge end being opened and closed by means of the test valve 92. If, with opening of the test valve 92, the piston construction and the steam valve do not move downwardly to supply steam to the auxiliary pump turbine, then this is an indication that interference, such as sticking of parts, occurs.

For regulators which operate in response to a controllable medium having a large time lag, the rate of response should have capability of adjustment over a wide range in order to obtain stability. The supply of oil under bearing pressure to the chamber 67 is restricted through the clearance between the bore 71 and the piston portion 70 and this restricted clearance will give the maximum time lag. The slightest motion of the piston element 61 having a considerable exposed area in the chamber 67 will require a make-up volume flowing through the restricted clearance area between the parts 70 and 71. An increase in bearing pressure will move the piston upwardly, but the resulting increase in volume of the chamber 67 will cause the pressure therein to decline as the flow area between the parts 70 and 71 is limited. Thus, the rate by which the piston can follow bearing pressure changes depends upon the restriction which is not adjustable. To provide adjustable means affording a more rapid rate of response, in Fig. 3, there is shown a passage 70' affording communication between the chambers 67 and the annular space 69, the passage having an adjustable needle valve 71'. By adjusting the valve 71', the rate of response can be adjusted as required.

In Fig. 4, there is shown a modified form of regulator, at 29a. The pistons 60a and 61a provide pressure areas exposed to the chambers 63a and 67a formed in the housing. Oil from a high-pressure portion of the system is supplied by means of the passages 64a, through the orifice 65a to the chamber 63a. Similarly, low-pressure or bearing oil is supplied to the chamber 67a through the passage 68a including the adjustable needle valve 69a. An air bell or accumulator 94 preferably communicates with the space 67a. High pressure in the chamber 63a exerted on the piston 60a is opposed by the spring 62a. A load spring 84a is interposed between the pistons, the force of this load spring being balanced by the resultant of the force of low pressure exerted on the piston 61a and that of the scale spring 85a.

Fig. 4, as compared to Fig. 2, shows a somewhat simpler and lighter construction, the lower piston having been substantially changed as well as the arrangement by means of which the cup valve 80a is adjusted with respect to the seat 78a. In Fig. 4, the piston 61a carries an upwardly-extending stem 95 whose upper end is formed to provide the cup valve. With bearing or low-pressure oil supplied to the chamber 67a and high-pressure oil supplied to the chamber 63a, if the bearing pressure increases, then the piston 61a rises against the load of the spring 85a and the cup valve 80a restricts the escape of high-pressure oil from the chamber 63a. Consequently, the pressure in the chamber 63a increases and the piston 60a is moved upwardly until the cup valve and the seat are sufficiently far apart to maintain the pressure in the chamber 63a.

If the bearing pressure drops, the piston 61a moves downwardly, moving the cup valve 80a away from its seat 78a and lowering the pressure in the chamber 63a, with the result that the piston 60a is moved downwardly by the spring 84a to move the steam valve, at 52a, in an opening direction.

The load spring 84a is used to take the main load of the oil pressure on the piston 61a and it does not add to the scale of the regulator, since relative motion of the pistons 61a and 60a is very small. This permits a scaleless regulator by omission of the scale spring 85a, or variation of regulation in any degree by proper choice of the spring 85a. This eliminates the necessity of large deadweights.

Here again the regulator has the advantage that it will not shut down the auxiliary oil pump unless a definite value of pressure of high-pressure oil is available. This means that the regulator partially controls the high-pressure oil for the scale of the spring 62a so that the regulator will continue to operate the auxiliary pump if insufficient high-pressure oil pressure exists irrespective of bearing oil pressure.

Also low pressures of the high-pressure oil can be used to operate the piston, since, in the opening direction, downward movement of the piston 61a decreases the spring load upward on the piston 60a. If the low or bearing pressure drops very low, then piston 61a moves downwardly, then, if sticking of the levers or of the steam valve occurs to such an extent that the oil under the piston drops to zero, continued motion downward of the piston 61a will permit the spring seat 96 to contact the stops 97, thus removing all the upward load of spring 63a on the piston 60a and resulting in considerable increase in force on the piston 60a.

In order to vary the bearing pressure, the force of the load spring 84a may be adjusted, the seat 98 and the threaded stem 99 serving this purpose.

While this invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. The combination with a system providing oil under high and low pressures and including main and auxiliary pumps, a driving motor for the auxiliary pump, and means for controlling the supply of energy to the driving motor, of a regulator for the energy-controlling means and including first and second pistons operatively connected to the latter, spring means acting on the pistons to move the latter in a direction to increase the energy supply, means providing first and second chambers for the first and second pistons and the latter having areas exposed to the chambers and so disposed that fluid pressures in the latter act on areas to oppose the spring means, means including a restriction for supplying oil from a high-pressure portion of the system to the first chamber, means for supplying oil from a low-pressure portion of the system to the second chamber, means providing for relative movement of the pistons in response to pressure changes in the chambers, and valve means responsive to relative movement of the pistons for controlling the escape of oil from the first chamber.

2. The combination with a system providing oil under high and low pressures and including main and auxiliary pumps, a driving motor for the auxiliary pump, and means for controlling the supply of energy to the driving motor, of a regulator for the energy-controlling means and including first and second pistons operatively connected to the latter, a first spring for moving the pistons in a direction to increase the energy supply, means providing first and second chambers for the first and second pistons and the latter having areas exposed to the chambers and so disposed that fluid pressures in the latter act on areas to oppose the first spring, means including a restriction for supplying oil from a high-pressure portion of the system to the first chamber, means including a restriction for supplying low-pressure oil to the low-pressure chamber, means providing for relative movement of the pistons in response to pressure changes in the chambers, and valve means responsive to relative movement of the pistons for controlling the escape of oil from the first chamber.

3. The combination with a system providing oil under high and low pressures and including main and auxiliary pumps, a driving motor for the auxiliary pump, and means for controlling the supply of energy to the driving motor, of a regulator for the energy-controlling means and including first and second pistons operatively connected to the latter, a first spring for moving the pistons in a direction to increase the energy supply, means providing first and second chambers for the first and second pistons and the latter having areas exposed to the chambers and so disposed that fluid pressures in the latter act on areas to oppose the first spring, means including a restriction for supplying oil from a high-pressure portion of the system to the first chamber, means including a restriction for supplying low-pressure oil to the low-pressure chamber, means providing for relative movement of the pistons and including a second spring interposed between the latter, and valve means responsive to relative movement of the pistons to control the escape of oil from the first chamber.

4. The combination with a system providing oil under high and low pressures and including main and auxiliary pumps, a driving motor for the auxiliary pump, and means for controlling the supply of energy to the driving motor, of a regulator for the energy-controlling means and including first and second pistons operatively connected to the latter, a first spring for moving the pistons in a direction to increase the energy supply, means providing first and second chambers for the first and second pistons and the latter having areas exposed to the chambers and so disposed that fluid pressures in the latter act on areas to oppose the first spring, means including a restriction for supplying oil from a high-pressure portion of the system to the first chamber, means including a restriction for supplying low-pressure oil to the low-pressure chamber, means providing for relative movement of the pistons and including a second spring interposed between the latter, and valve means responsive to relative movement of the piston to vary the escape of oil from the first chamber such that relative movement in response to preponderance of force of the second spring over fluid pressure force or forces opens the valve means to increase the escape of oil from the first chamber and vice versa.

5. The combination with a system providing oil under high and low pressures and including main and auxiliary pumps, a driving motor for the auxiliary pump, and means for controlling the supply of energy to the driving motor, of a regulator for the energy-controlling means and including first and second pistons operatively connected to the latter, a first spring for moving the pistons in a direction to increase the energy supply, means providing first and second chambers for the first and second pistons and the latter having areas exposed to the chambers and so disposed that fluid pressures in the latter act on areas to oppose the first spring, means including a restriction for supplying oil from a high-pressure portion of the system to the first chamber, means including a restriction for supplying low-pressure oil to the low-pressure chamber, means providing for relative movement of the pistons and including a second spring interposed between the latter, means responsive to relative movement of the pistons to operate the valve means to vary the escape of oil from the first chamber, and means providing for variation of force of the second spring in relation to operation of the valve means.

6. The combination with a system providing oil under high and low pressures and including main and auxiliary pumps, a driving motor for the auxiliary pump, and means for controlling the supply of energy to the driving motor auxiliary pump, of a regulator for the energy-controlling means and including first and second pistons operatively connected to the latter, a first spring for moving the pistons in a direction to increase the energy supply, means providing first and second chambers for the pistons and the latter having areas exposed to the chambers and so disposed that pressures in the latter act on areas to oppose the first spring, means including a restriction for supplying oil for a high-pressure portion of the system to the first chamber, means including a restriction for supplying oil from a low-pressure portion of the system to the second chamber, means providing for relative movement of the pistons and including a second spring interposed between the latter, valve means responsive to relative movement of the pistons to vary the escape of oil from the first chamber, and means for adjusting the force of the first spring.

7. The combination with a system providing oil under high and low pressures and including main and auxiliary pumps, a driving motor for the auxiliary pump, and means for controlling the supply of energy to the driving motor, of a regulator for the energy-controlling means and including first and second pistons operatively connected to the latter, a first spring for moving the pistons in a direction to increase the energy supply, means providing first and second chambers for the pistons and the latter having areas exposed to the chambers and so disposed that pressures in the latter act on areas to oppose the first spring, means including a restriction for supplying oil for a high-pressure portion of the system to the first chamber, means including a restriction for supplying oil from a low-pressure portion of the system to the second chamber, means providing for relative movement of the pistons and including a second spring interposed between the latter, valve means responsive to relative movement of the pistons to vary the escape of oil from the first chamber, and a scale spring cooperating with the second piston so that the resultant of force thereof and of oil pressure acting on the piston is opposed by the force of the second or interposed spring.

8. The combination with a system providing oil under high and low pressures and including main and auxiliary pumps, a driving motor for the auxiliary pump, and means for controlling the supply of energy to the driving motor, of a regulator for the energy-controlling means and including first and second pistons operatively connected to the latter, a first spring for moving the pistons in a direction to increase the energy supply, means providing first and second chambers for the pistons and the latter having areas exposed to the chambers and so disposed that pressures in the latter act on areas to oppose the first spring, means including a restriction for supplying oil from a high-pressure portion of the system to the first chamber, means including a restriction for supplying oil from a low-pressure portion of the system to the second chamber, means providing for relative movement of the pistons and including a second spring interposed between the latter, valve means responsive to relative movement of the pistons to vary the escape of oil from the first chamber, means providing for adjustment of the first spring, a scale spring cooperating with the second piston so that the resultant of the force thereof and of oil pressure acting on the piston is opposed by the force of the second or interposed spring, and means providing for variation in force of the second or interposed spring in relation to operation of the valve means.

9. The combination with a system providing oil under high and low pressures and including main and auxiliary pumps, a driving motor for the auxiliary pump, and means for controlling the supply of energy to the driving motor, of a regulator for the energy-controlling means and including coaxial first and second pistons, a stem for transmitting movement from the first piston to the energy-controlling means to control the operation of the latter, a first spring acting on the first piston to move the latter in a direction to operate the energy-controlling means to increase the supply of energy, means providing first and second chambers for the first and second pistons and the latter having areas exposed to the chambers and so disposed that fluid pressures in the latter act on areas to oppose the first spring, means including a restriction for supplying oil from a high-pressure portion of the system to the first chamber, means for supplying oil from a low-pressure portion of the system to a second chamber, a valve responsive to relative movement of the pistons to control the escape of oil from the first chamber, a second spring interposed between the pistons and effective to move the valve to increase the escape of oil from the first chamber, and a scale spring cooperating with the second piston so that the resultant of the force thereof and of fluid pressure acting on the piston is opposed by the force of the interposed or second spring.

10. The combination with a system providing oil under high and low pressures and including main and auxiliary pumps, a driving motor for the auxiliary pump, and means for controlling the supply of energy to the driving motor, of a regulator for the energy-controlling means and including coaxial first and second pistons, a stem for transmitting movement from the first piston to the energy-controlling means to control the operation of the latter, a first spring acting on the first piston to move the latter in a direction to operate the energy-controlling means to increase the supply of energy, means providing first and second chambers for the first and second pistons and the latter having areas exposed to the chambers and so disposed that fluid pressures in the latter act on areas to oppose the first spring, means including a restriction for supplying oil from a high-pressure portion of the system to the first chamber, means for supplying oil from a low-pressure portion of the system to a second chamber, a valve responsive to relative movement of the pistons to control the escape of oil from the first chamber, a second spring interposed between the pistons and effective to move the valve to increase the escape of oil from the first chamber, a scale spring cooperating with the second piston so that the resultant force thereof and of fluid pressure acting on the piston is opposed by the force of the interposed or second spring, and means providing for variation of the force of the second or interposed spring in relation to operation of the valve means in order to vary the fluid pressure.

11. The combination with a system providing oil under high and low pressures and including main and auxiliary pumps, a driving motor for the auxiliary pump, and means for controlling the supply of energy to the driving motor, of a regulator for the energy-controlling means and including first and second coaxial pistons, a stem for transmitting movement of the first piston to the energy-controlling means to operate the latter, a first spring for moving the first piston to operate the energy-controlling means to increase the supply of energy, means providing first and second pressure chambers for the first and second pistons and the latter having areas exposed to the chambers and so disposed that fluid pressures in the latter act on areas to oppose the first spring, means including a restriction for supplying oil from a high-pressure portion of the system to the first chamber, means for supplying oil from a low-pressure portion of the system at a restricted rate to the second chamber, means providing for relative movement of the pistons and including a second spring interposed between the latter, valve means responsive to relative movement of the pistons to vary the escape of oil from the first chamber, a scale spring cooperating with the second piston so that the resultant of the force thereof and of fluid pressure acting on the piston is opposed by the force of the second or interposed spring, a discharge passage for the second chamber, and a testing valve for opening and closing the discharge passage.

12. The combination with a system providing oil under high and low pressures and including main and auxiliary pumps, a driving motor for the auxiliary pump, and means for controlling the supply of energy to the driving motor, of a regulator for the energy-controlling means and including coaxial first and second pistons, a stem for transmitting movement of the first piston to the energy-controlling means to operate the latter, a spring acting on the first piston to move the latter in a direction to operate the controlling means to increase energy supply, means providing first and second chambers for the first and second pistons and the latter having areas exposed to the chambers and so disposed that fluid pressures on the latter act on areas to oppose the first spring, means including a restriction for supplying oil from a high-pressure portion of the system to the first chamber, means providing for the supply of oil from the low-pressure portion of the system to the second chamber, said first piston having a passage providing for escape of oil from the first chamber to the space at the side of the first piston opposite to the chamber, said stem including a central member axially adjustable with respect thereto and having a tubular portion providing a part of said communicating passage and having its end providing an annular valve seat, a cup valve cooperating with said seat, a head connected by a stem to the cup valve, a second spring interposed between the first piston and the head, said second piston abutting the head, a bellows for connecting the second piston to the first piston, and a scale spring interposed between the housing and the second piston.

JULIUS J. GABALIS.
ANTHONY F. SCHWENDNER.